United States Patent [19]

Manly

[11] 3,750,112

[45] July 31, 1973

[54] METHOD AND APPARATUS OF EDITING USING COLORED EDITING MARKS

[76] Inventor: Ron Manly, 1922 W. El Segunda Blvd., Gardena, Calif. 90249

[22] Filed: May 1, 1972

[21] Appl. No.: 249,354

Related U.S. Application Data

[60] Division of Ser. No. 63,020, Aug. 11, 1970, Pat. No. 3,676,856, which is a continuation of Ser. No. 275,415, April 24, 1963.

[52] U.S. Cl. .......... 340/172.5
[51] Int. Cl. .......... G06f 11/00, B41j 5/30
[58] Field of Search .......... 340/172.5

[56] References Cited

UNITED STATES PATENTS 2,967,295 1/1961 Dirks .......... 340/172.5
3,007,137 10/1961 Page et al. .......... 340/172.5

*Primary Examiner*—Raulfe B. Zache

[57] ABSTRACT

Methods and systems to avoid manually retyping or rekeyboarding textual material when revising or correcting the information contained in a record either while originally preparing the information or at a later date. The use of print readers or character recognition devices to accomplish this "editing" is disclosed, as well as editing using paper tape typewriters, display devices, and other means such as using editing instructions. Methods are also disclosed for automatically reformatting the information into lines after insertions, deletions, or other changes requiring shifting of the line layout of the information.

20 Claims, 3 Drawing Figures

METHOD AND APPARATUS OF EDITING USING COLORED EDITING MARKS

CROSS-REFERENCES TO RELATED APPLICATIONS

This is a division of application Ser. No. 63,020 filed Aug. 11, 1970, now U.S. Pat. No. 3,676,856, which in turn is a continuation of application Ser. No. 275,415 filed Apr. 24, 1963.

BRIEF SUMMARY OF THE INVENTION

Briefly, in one example of the present invention there is provided a manually operated typewriter having a type font which for each character makes two impressions. One of the impressions is a more or less conventional typewritten character which is man readable; and the other is a digitally encoded set of information bits which is machine readable. Alternatively, the type font may be conventionally unitary, but readable by an appropriate character reader. In either event the impression is machine readable.

The document output of this typewriter may be designated as the original record and may be a first draft of, for example, a technical paper. The author then proofreads the original record and, with a special pen, manually makes editing marks directly onto the paper. The editing marks in this example may be of three different optically machine separable colors, and may be inserted in one of three different portions of the space allotted to a particular character, for example, above, below, or in front of the typed character. In a specific example, a vertical stroke of the editing pen in a particular color along the left hand edge of a character space may be a "start delete" edit instruction to delete what follows. A horizontal edit stroke of a different color along the top edge of the character space of a succeeding character may be an edit instruction to "stop delete". Hence, the completed instruction is to delete whatever material or blank character spaces were originally disposed between the two edit marks.

The distinction between "deleting" and "removing" should be carefully noted. The latter, applied to a typewritten page, is the removal of any printing which may occur; more generally, it is the conversion of any other character into a blank character space.

In another example, a particular edit mark or more generally stated, edit signal, may be an instruction to "insert here" material which is separately generated by the original typewriter mentioned above. In addition, "delete" and "insert", as well as other instructions, may be combined as, for example, to form a "replace" instruction.

The integrated automatic editing system of this example includes two machine readers; one for reading the original record with the manually scribed editing marks or signals thereon, and the second for reading the "insert record" which includes additional material to be inserted in the final record in accordance with the editing signals. Each of the readers is coupled to an automatic final record generator, such as an electric typewriter which is operated by electrical signals from readers and particularly, but not exclusively, from the output terminals of their respective selection matrices.

Included within the reader for the original record is an edit mark reader which observes each character space and determines whether an edit mark has been placed therein and if so, which of the three colors it is and in which portion of the space it has been scribed. The edit mark reader than interprets the edit mark and insructs the machine readers alternately to provide the desired combination of signals in proper sequence to the generator of the final record.

BRIEF DESCRIPTION OF THE FIGURES

Further details of these and other novel features and their principles of operation, as well as the objects and advantages will become apparent and be best understood from a consideration of the description contained in the application identified below (which is incorporated by reference) when taken in connection with the drawings therein.

Three of the drawings from said incorporated application are presented herein by way of example only, and in which.

Figure 1:
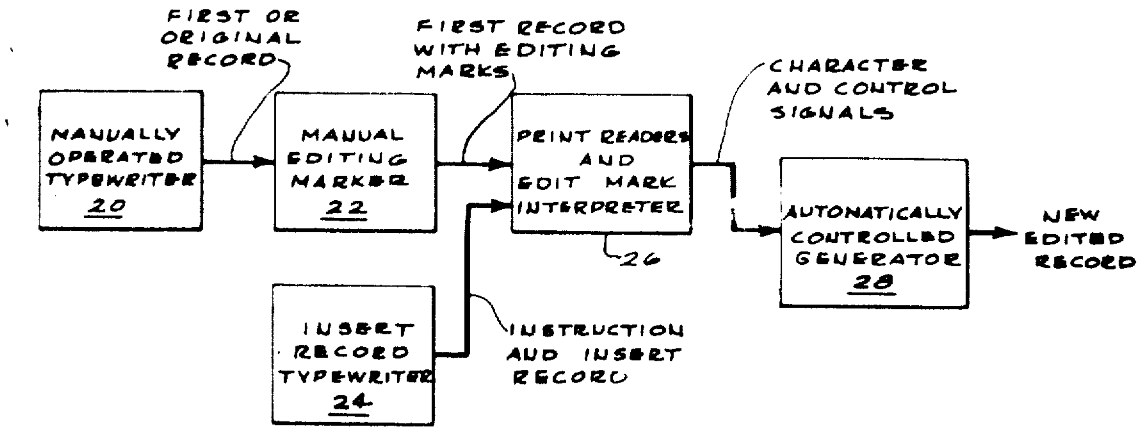
FIG. 1 is a block diagram of an example of an automatic editing system embodying the principles of the present invention.
Figure 2:
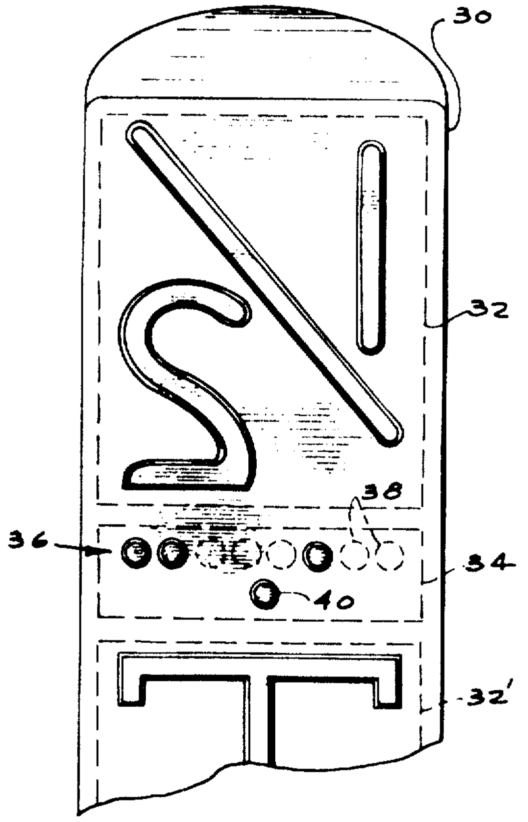
FIG. 2 is a plan view of a type face which may be utilized to provide a man-machine readable writing in accordance with the present invention.
Figure 3:
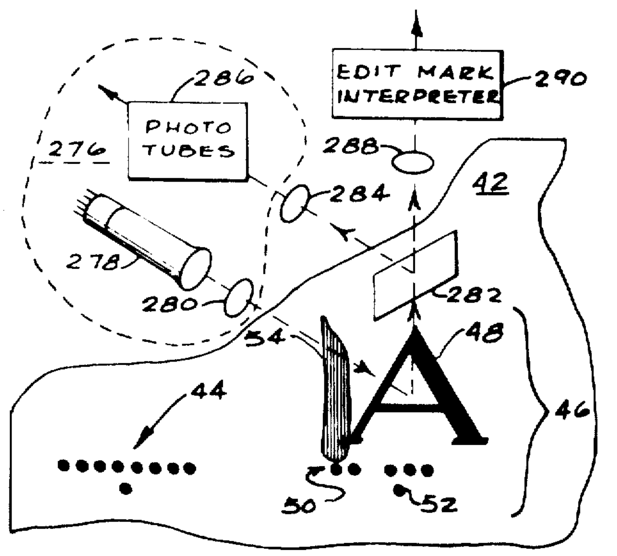
FIG. 3 is a plan view of an upper left hand corner portion of a typical page of a man-machine readable first record including a character representation as provided, for example, by the manually operated typewriter of FIG. 1; also shown in FIG. 3 is an example of the adaptation of a conventional character reader to operate with an edit mark interpreter.

It should be noted that FIGS. 1, 2, and 3 presented herein are identical to FIGS. 1, 2a and 3 of the referenced application of which this application is a division.

Referring to the particular Figures of the referenced application and those presented herein, it is stressed that the details shown are by way of example only and are presented in the cause of providing what is believed to be the most useful and readily understood description of the principles of the invention. The detailed showing is not to be taken as a limitation upon the scope of the invention which is to be measured by the appended claims forming a part of this specification.

IDENTIFICATION OF REFERENCED APPLICATION

The contents of application Ser. No. 63,020, filed Aug. 11, 1970, now U.S. Pat. No. 3,676,856, in its entirety is herein incorporated by reference.

What is claimed is:

1. Method of editing a first message at a message element location arbitrarily selectable subsequent to the original generation of said message comprising the steps of:

providing a man-machine readable first record having a first message element train containing said first message recorded thereon;

providing editing indicia specifying said arbitrarily selectable message element location where editing is desired subsequent to the original generation of said first message and the desired editing changes in said first message element train, said step of providing editing indicia including the step of manually providing editing signals by entering colored editing marks upon said first record; and automatically generating a revised message element train containing the intelligence of said first message element train as modified in accordance with the desired editing changes specified by said editing signals.

2. Method of editing a message in accordance with claim 1 in which said step of generating a revised message element train includes the steps of machine reading said first message on said man-machine readable record, machine detecting said editing marks, machine interpreting said editing marks, and machine generating a revised message element train containing the intelligence of said first record as modified in accordance with the desired editing changes specified by said editing marks.

3. Method of editing a message according to claim 2 in which said step of detecting said editing marks is performed by an edit mark reader and said step of reading said man-machine record is performed by a character recognition reader.

4. Method of editing a message in accordance with claim 3 which also includes the additional step of automatically associating appropriate formatting signals with said revised message element train to permit page formatting.

5. Method of editing a message in accordance with claim 2 in which said step of providing a man-machine readable first record includes the step of selecting the electromagnetic spectral reflection and absorbtion characteristics of the indicia of the characters printed on said man-machine readable record to substantially abosrb a first frequency spectrum band, and in which said step of providing colored editing marks includes the step of selecting the electromagnetic spectral reflection and absorbtion characteristics of the material deposited when scribing said colored editing marks to be substantially transparent to said first frequency spectrum band.

6. Method of editing a message in accordance with claim 5 in which said step of selecting the spectral characteristics of said indicia of the characters printed on the man-machine readable first record is performed by selecting the indicia to substantially absorb a first frequency spectrum band and to substantially reflect a second frequency spectrum band, and in which said step of selecting the material deposited when scribing said colored editing marks is performed by selecting the material to be substantially transparent to said first frequency spectrum band and to be substantially transparent to a specific subportion of said second frequency spectrum band while substantially absorbing the remainder of said second frequency spectrum band, said subportion depending upon the color of each of said marks.

7. Method of editing a message in accordance with claim 5 in which said step of selecting the spectral characteristics of said indicia of the characters printed on the man-machine readable first record is performed by selecting the indicia to substantially absorb a first frequency spectrum band, and, in which said step of selecting the material deposited when scribing said colored editing marks is performed by selecting the material to be substantially transparent to said first frequency spectrum band and to substantially reflect a specific subportion of a second frequency spectrum band while substantially absorbing the remainder of said second frequency band, said subportion depending upon the color of each of said marks.

8. Method of editing a message in accordance with claim 2 in which said step of machine reading said first message includes filtering the electromagnetic waves emanating from said man-machine readable record to substantially absorb the energy in certain electromagnetic frequency spectrum bands, said bands having been chosen such that significant portions of the energy in such bands are subject to being absorbed due to the presence of an editing mark, said filtering resulting in the remaining energy utilized for machine detection of said first message being substantially unchanged due to the presence of any editing marks on said record.

9. Method of editing a message in accordance with claim 1 which also includes the additional step of automatically associating appropriate formatting signals with said revised message element train to permit page formatting.

10. Method of editing a message in accordance with claim 1 which also includes the additional step of providing a second man-machine readable insert record containing the intelligence of a desired message insert, in which said editing signals include instructions as to the desired location of said message insert, and in which said step of generating a revised message element train includes the step of inserting said message elements of said message insert to form said revised message element train in accordance with the interpretation of said editing signals.

11. Method of preparing and editing a man-machine readable document according to claim 9 in which said man-machine readable first record is a preliminary draft of a document, in which said step of providing a man-machine readable first record comprises the step of generating a man-machine readable preliminary draft, in which said step of providing editing signals includes the step of visually proofreading said draft, and in which said step of generating a revised message element train includes the steps of providing electrical regeneration signals representing message elements of said revised message train, providing electrical control signals representing said formatting signals, impressing said electrical regenerating signals and said electrical control signals upon an electrically actuated record generator, and generating a record representing the intelligence of said document as revised.

12. The method of editing of machine translations of natural language messages in accordance with claim 11 in which said step of generating a man-machine readable preliminary draft includes the steps of providing a natural language message, and automatically translating said message and generating a man-machine readable preliminary draft containing said translated message.

13. The method of editing a machine regognized speech messages in accordance with claim 11 in which said step of generating a man-machine readable preliminary draft includes the steps of providing a speech message, and automatically recognizing said speech message and generating a man-machine readable preliminary draft containing a symbolic message which is the result of said recognizing.

14. Method for automatically editing a message comprising the steps of:

providing a first record, said first record being machine readable, including the sub-steps of manual keyboarding the message elements of said first record, automatically generating a man readable hardcopy record in response to said keyboarding, and manually inputting said first record into a reader; and providing an edit location and edit instruction machine readable second record specifying desired editing changes on said first record, including manually entering colored editing marks upon said man readable hardcopy at message element space locations corresponding to and correlated with message space locations on said first record, said edit marks indicating where editing changes are desired;

machine reading and interpreting said second record and generating signals representative of said edit instructions thereof, including machine detecting and interpreting said editing marks upon said man readable hardcopy records;

machine reading said first record; and generating a message element train containing the intelligence of said first record as modified in accordance with the desired editing changes.

15. Automatic editing system comprising:

a manually operated means for generating a man readable record;

a machine readable record generating means coupled to said manually operated means for generating a machine readable record corresponding to, correlated with, and containing substantially the same intelligence as said man readable record;

an editing marker for manually entering colored editing marks upon said man readable record;

an edit signal reader for machine detecting and intepreting said editing marks upon said man readable record; and machine reading means for reading said intelligence on said machine readable record, said machine reading means including a message synthesizer coupled to the output of said edit signal reader for providing a resulting message element train representative of said machine readable record as changed in accordance with the interpretation of said editing symbols and said editing marks.

16. Automatic editing system according to claim 15 in which said message synthesizer includes an intelligence arraying means having an automatic line ending means for automatically providing formatting signals to permit page formatting, said formatting signal being associated with said resulting message element train.

17. Automatic editing system according to claim 15 in which said machine reading means includes a machine record reader for reading said intelligence on each of the message element locations of said machine readable record, and in which said message synthesizer also includes reader movement control logic coupled to said edit signal reader and to said machine record reader which causes the edit signal reader to read editing marks in synchronization with the reading by said machine record reader of message elements from related message element locations in the message to be edited.

18. Automatic editing system according to claim 17 in which said machine readable record generating means also includes means for moving said machine readable record in one-to-one synchronization with the backward and advance movements of said man-readable record, and in which said reader movement control logic causes said machine record reader and said edit signal reader to step through one-to-one corresponding positions on the machine readable record and the man-readable record, respectively, said corresponding positions being independent of the specific message elements and any editing marks or symbols which are contained on the records.

19. Automatic editing system according to claim 17 in which said machine readable record generating means includes means for reading back any of said machine readable recordings and for providing readback signals, and a logic network coupled to and receiving said readback signals from said means for reading back, said logic network moving said machine readable record for synchronizing the symbols of the primary intelligence recorded on the man readable record with the corresponding symbols on the machine readable record; and in which said reader movement control logic includes means for generating control signals for moving said man readable record in said edit signal reader corresponding to the previous movements of said man readable record in said manually operated means as indicated by the intelligence recorded on said machine readable record.

20. Automatic editing system according to claim 17 in which said manually operated means also includes movement control means for moving said man readable record, in which said machine readable record generating means includes means for generating machine readable recordings of the movements effected by said movement control means, and in which said reader movement control logic also includes means for generating control signals for moving said man readable record in said edit signal reader corresponding to the previous advancing movements of said man readable record in said manually operated means as indicated by the intelligence recorded on said machine readable record, logic means for detecting the presence in the backspace region of the formatting point as indicated by the intelligence recorded on said machine readable record, and logic means for inhibiting movement signals to the edit signal reader when the formatting point is in the backspace region.

* * * * *